(12) United States Patent
Chen

(10) Patent No.: US 12,192,435 B2
(45) Date of Patent: Jan. 7, 2025

(54) HAND-HELD BINOCULAR FISHEYE 3D VR CAMERA

(71) Applicant: CALF TECHNOLOGY PTE. LTD., Singapore (SG)

(72) Inventor: Hua Chen, Beijing (CN)

(73) Assignee: CALF TECHNOLOGY PTE. LTD., Singapore (SG)

( * ) Notice: Subject to any disclaimer, the term of this patent is extended or adjusted under 35 U.S.C. 154(b) by 117 days.

(21) Appl. No.: 18/303,699

(22) Filed: Apr. 20, 2023

(65) Prior Publication Data
US 2024/0357068 A1    Oct. 24, 2024

(51) Int. Cl.
| | |
|---|---|
| H04N 13/207 | (2018.01) |
| G02B 13/06 | (2006.01) |
| G03B 17/55 | (2021.01) |
| H04N 23/51 | (2023.01) |
| H04N 23/54 | (2023.01) |

(52) U.S. Cl.
CPC .......... *H04N 13/207* (2018.05); *G02B 13/06* (2013.01); *G03B 17/55* (2013.01); *H04N 23/51* (2023.01); *H04N 23/54* (2023.01); *H04N 2213/001* (2013.01)

(58) Field of Classification Search
CPC ...... H04N 13/207; H04N 23/51; H04N 23/54; H04N 2213/001; G02B 13/06; G03B 17/55
See application file for complete search history.

(56) References Cited

U.S. PATENT DOCUMENTS

| | | | |
|---|---|---|---|
| 2022/0294955 A1* | 9/2022 | Yoshida | G03B 17/561 |
| 2022/0365406 A1* | 11/2022 | Ye | G03B 17/561 |
| 2023/0050153 A1* | 2/2023 | Lee | H10K 59/88 |
| 2023/0164918 A1* | 5/2023 | Watanabe | H05K 7/20136 |
| | | | 348/208.7 |
| 2024/0205525 A1* | 6/2024 | Ueda | H04N 23/54 |

FOREIGN PATENT DOCUMENTS

| | | |
|---|---|---|
| CN | 206117841 U | 4/2017 |
| CN | 206133167 U | 4/2017 |
| CN | 107631860 A | 1/2018 |

* cited by examiner

*Primary Examiner* — Shadan E Haghani
(74) *Attorney, Agent, or Firm* — Nitin Kaushik

(57) ABSTRACT

The invention relates to the technical field of camera, in particular, to a hand-held binocular fisheye 3D VR camera, which includes a housing and a lens assembly mounted on the housing. A bottom surface inside the housing is mounted with an MIC board, and a main bracket is mounted inside the housing. A rear surface of the main bracket is provided with a structural port plate, a sensor body and a sensor board bracket. A front surface of the main bracket is mounted with a cooling bracket and a main board, and one end of the rear surface of the main bracket is mounted with a speaker. The invention is provided with the MIC board and the speaker, supporting three recording modes of photographing, video recording and live broadcast.

8 Claims, 2 Drawing Sheets

HAND-HELD BINOCULAR FISHEYE 3D VR CAMERA

TECHNICAL FIELD

The invention relates to the technical field of camera, in particular, to a hand-held binocular fisheye 3D VR camera.

BACKGROUND

VR cameras on the market are all 2D flat 360-degree cameras, or monocular 3D flat 360 cameras, and the captured content does not have a three-dimensional effect. Since the human viewing angle is close to 220 degrees, a binocular spherical display is required to truly replicate the human visual experience, so that people cannot watch immersively with the above cameras. The clarity is not up to the appreciation standard of VR glasses, and people can only watch on their mobile phones. The above cameras can only take pictures, but cannot shoot videos and live streaming. Further, due to the relatively large design cost investment, the volume is relatively large and heavy, and the price is also very expensive.

SUMMARY

The invention aims at solving the above drawbacks, so as to provide a hand-held binocular fisheye 3D VR camera.

In order to solve the above technical problem, the invention adopts the following technical solutions: a hand-held binocular fisheye 3D VR camera includes a housing and a lens assembly mounted on the housing, wherein a bottom surface inside the housing is mounted with an MIC board, and a main bracket is mounted inside the housing: the main bracket is located above the MIC board, and a rear surface of the main bracket is sequentially provided with a structural port plate, a sensor body and a sensor board bracket from the inside to the outside; the sensor body is mounted on a front surface of the sensor board bracket, and the structural port board and the sensor board bracket are stacked and mounted on the main bracket, a front surface of the main bracket is sequentially mounted with a cooling bracket and a main board from the inside to the outside, and one end of the rear surface of the main bracket is mounted with a speaker; the lens assembly includes two sets of lens portions, and the lens portion includes a lens body, a first lens mount and a second lens mount; the second lens mount is mounted inside the sensor board bracket, the first lens mount is mounted on a rear surface of the housing, and the lens body is mounted inside the housing through the first lens mount and the second lens mount.

Further, one end of the cooling bracket is mounted with a battery.

Further, a front surface of one end of the main board is mounted with a key board.

Further, the housing includes a front housing and a rear housing, a front surface of the front housing is mounted with a screen, and an edge of the front housing is mounted with a decorative block for decoration.

Further, a bottom surface of the structural port board is electrically connected with an adapter FPC, and an end of the adapter FPC is electrically connected with the main board.

Further, the speaker, the MIC board, and the sensor body are all electrically connected with the main board.

Further, the lens body is a binocular fisheye lens.

Further, one side surface of the housing is electrically connected with a USB interface through the main board.

The invention has the beneficial effects as follows:

Compared with the prior art, the invention is provided with the MIC board and the speaker, hence supporting three recording modes of photographing, video recording and live broadcast, wherein the screen provided is a touch screen that supports shooting while watching, and the distance between the center of the lens body in the two lens portions of the lens body is 65 mm, which is more in line with the normal feeling of the human body due to an average interpupillary distance of the human eye of 65 mm.

In figures: 1—lens body; 2—first lens mount; 3—front housing; 4—sensor board bracket; 5—second lens mount; 6—sensor body; 7—speaker; 8—structural port board; 9—adapter FPC; 10—MIC board; 11—main bracket; 12—cooling bracket; 13—battery; 14—main board; 15—key board; 16—rear housing; 17—screen; 18—decorative block.

DETAILED DESCRIPTION OF THE EMBODIMENTS

In order to facilitate the understanding of those skilled in the art, the invention will be further described below in conjunction with the embodiments and accompanying drawings, and the contents mentioned in the embodiments are not intended to limit the invention. Detail description will be made on the invention below in combination with the drawings.

Figure 1:
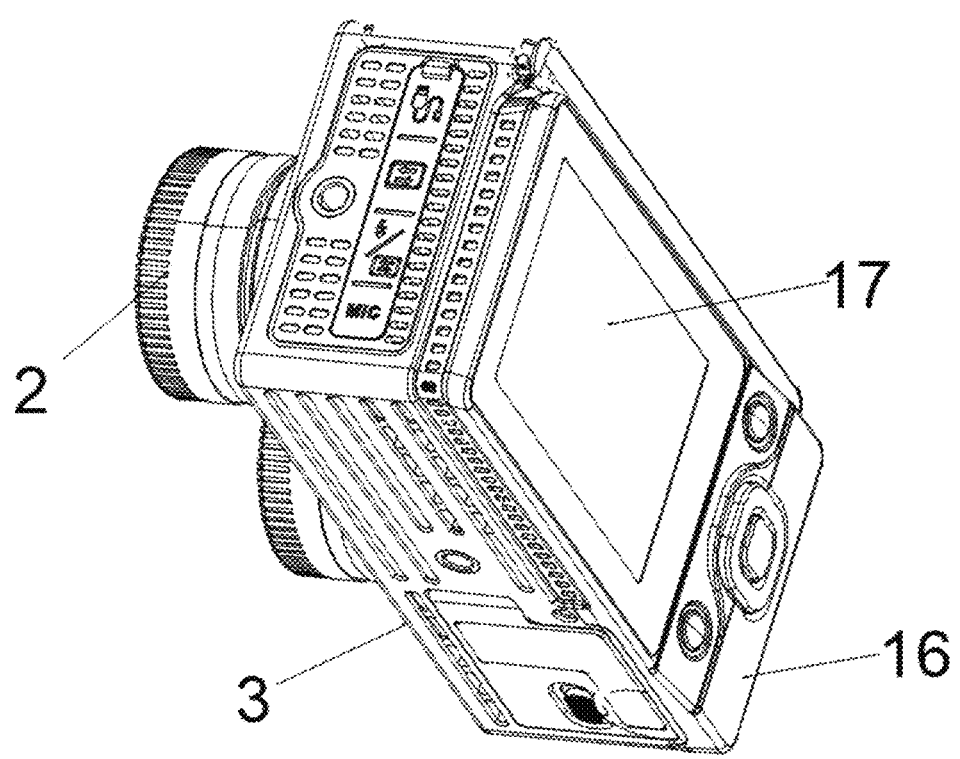
FIG. 1 is a three-dimensional diagram of a hand-held binocular fisheye 3D VR camera according to the invention.
Figure 2:
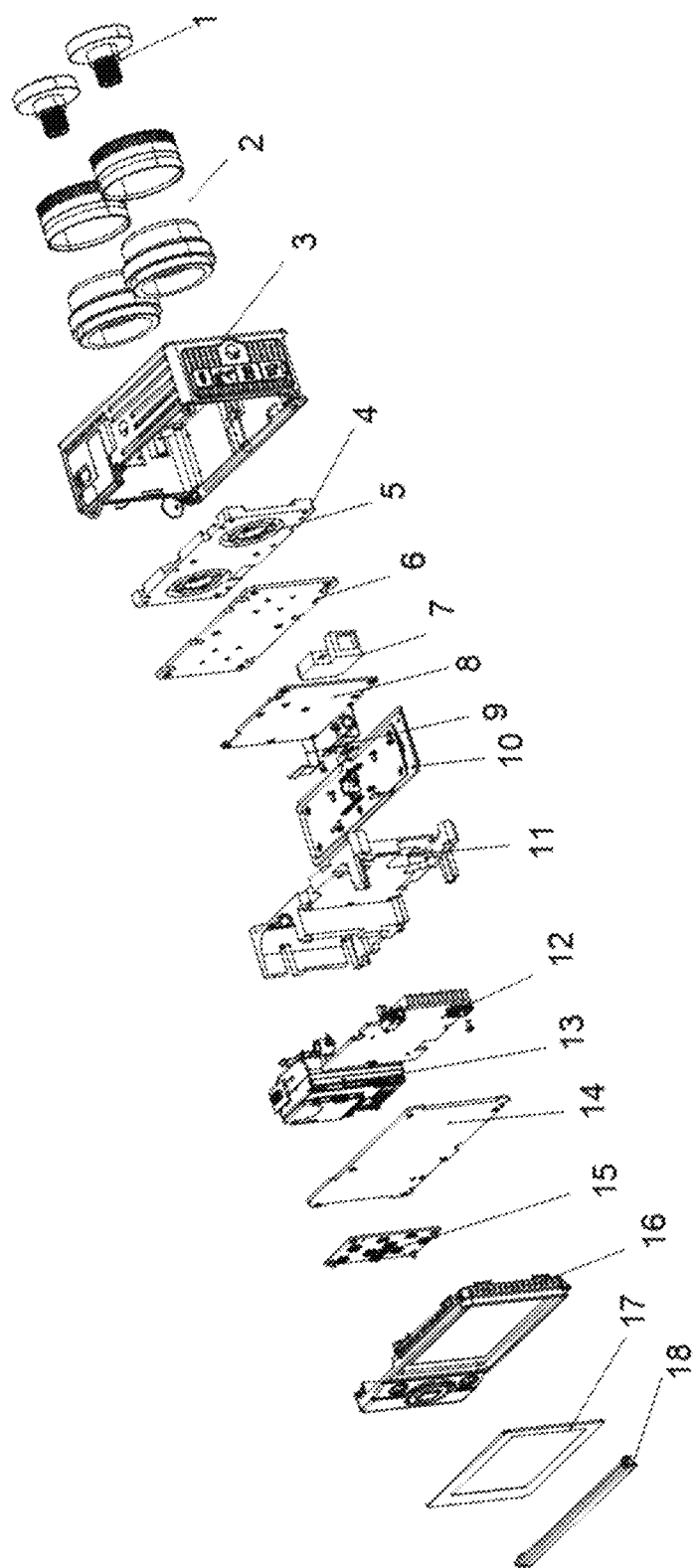
FIG. 2 is an exploded diagram of the hand-held binocular fisheye 3D VR camera according to the invention.

With reference to FIGS. 1 to 2, in a specific embodiment, a hand-held binocular fisheye 3D VR camera includes a housing and a lens assembly mounted on the housing, wherein a bottom surface inside the housing is mounted with an MIC board 10, and a main bracket 11 is mounted inside the housing: the main bracket 11 is located above the MIC board 10, and a rear surface of the main bracket 11 is sequentially provided with a structural port plate 8, a sensor body 6 and a sensor board bracket 4 from the inside to the outside; the sensor body 6 is mounted on a front surface of the sensor board bracket 4, and the structural port board 8 and the sensor board bracket 4 are stacked and mounted on the main bracket 11; a front surface of the main bracket 11 is sequentially mounted with a cooling bracket 12 and a main board 14 from the inside to the outside, and one end of the rear surface of the main bracket 11 is mounted with a speaker 7; the lens assembly includes two sets of lens portions, and the lens portion includes a lens body 1, a first lens mount 2 and a second lens mount 5; the second lens mount 5 is mounted inside the sensor board bracket 4, the first lens mount 2 is mounted on a rear surface of the housing, and the lens body 1 is mounted inside the housing through the first lens mount 2 and the second lens mount 5.

One end of the cooling bracket 12 is mounted with a battery 13. A front surface of one end of the main board 14 is mounted with a key board 15. The housing includes a front housing 3 and a rear housing 16, a front surface of the front housing 3 is mounted with a screen 17, and an edge of the front housing 3 is mounted with a decorative block 18 for decoration. A bottom surface of the structural port board 8 is electrically connected with an adapter FPC 9, and an end of the adapter FPC 9 is electrically connected with the main board 14. The speaker 7, the MIC board 10, and the sensor body 6 are all electrically connected with the main board 14. The lens body 1 is a binocular fisheye lens. One side surface of the housing is electrically connected with a USB interface through the main board 14.

The invention is provided with the MIC board 10 and the speaker 7, hence supporting three recording modes of photographing, video recording and live broadcast, wherein the screen 17 provided is a touch screen that supports shooting while watching, and the distance between the center of the lens body 1 in the two lens portions of the lens body 1 is 65 mm, which is more in line with the normal feeling of the human body due to an average interpupillary distance of the human eye of 65 mm; the binocular fisheye lens with a 185-degree viewing angle and a diameter of 32 mm has a large amount of light input and a large effective field of view, making the captured video very clear without distortion at the edge. The video recording is high-definition and may be clearly viewed on VR glasses such as quest and pico. Video samples may be watched on the Calf VR app by directly using quest and pico, with the definition comparable to the effect of the industrial 100,000-level professional VR180 camera. The sensor body 6 uses a Sony IMX577 12-megapixel sensor, which is fused through software algorithms to achieve 5.6K VR180 high-definition recording. The screen 17 is a 3.5-inch touch-screen monitor, which is easy to operate while watching and shooting. The battery 13 adopts a 2250 mAh standard replaceable camera battery 13, which may continuously shoot videos and perform live broadcast for more than 1 hour. The USB interface provided may be used as an external camera to connect to the PC, and directly perform external live broadcast through the PC, or connect to the PC as an external storage (u disk) while directly operating the photos and videos in the camera through the PC. Because of the MIC board 10 provided, the invention supports external lavalier microphones, making shooting more professional and recording clearer. The body is small in size, light in weight, and easy to carry.

What is described above is only the preferred embodiments of the present invention but does not limit the present invention in any form. The preferred embodiments are used to disclose the present invention as above but not to limit the present invention. Those skilled in the art may utilize the disclosed technical contents to make some alterations and modifications as equivalent embodiments of equal changes without departing form the scope of the technical scheme of the present invention and any simple alterations, equivalent changes and modifications made according to the technical essence of the present invention without departing from the technical contents of the present invention should be contained in the scope of the technical solution of the present invention.

What is claimed is:

1. A hand-held binocular fisheye 3D VR camera, comprising a housing and a lens assembly mounted on the housing, wherein a bottom surface inside the housing is mounted with an MIC board, and a main bracket is mounted inside the housing: the main bracket is located above the MIC board, and a rear surface of the main bracket is sequentially provided with a structural port plate, a sensor body and a sensor board bracket from the inside to the outside; the sensor body is mounted on a front surface of the sensor board bracket, and the structural port board and the sensor board bracket are stacked and mounted on the main bracket, a front surface of the main bracket is sequentially mounted with a cooling bracket and a main board from the inside to the outside, and one end of the rear surface of the main bracket is mounted with a speaker; the lens assembly comprises two sets of lens portions, and the lens portion comprises a lens body, a first lens mount and a second lens mount; the second lens mount is mounted inside the sensor board bracket, the first lens mount is mounted on a rear surface of the housing, and the lens body is mounted inside the housing through the first lens mount and the second lens mount.

2. The hand-held binocular fisheye 3D VR camera according to claim 1, wherein one end of the cooling bracket is mounted with a battery.

3. The hand-held binocular fisheye 3D VR camera according to claim 1, wherein a front surface of one end of the main board is mounted with a key board.

4. The hand-held binocular fisheye 3D VR camera according to claim 1, wherein the housing comprises a front housing and a rear housing, a front surface of the front housing is mounted with a screen, and an edge of the front housing is mounted with a decorative block for decoration.

5. The hand-held binocular fisheye 3D VR camera according to claim 1, wherein a bottom surface of the structural port board is electrically connected with an adapter FPC, and an end of the adapter FPC is electrically connected with the main board.

6. The hand-held binocular fisheye 3D VR camera according to claim 1, wherein the speaker, the MIC board, and the sensor body are all electrically connected with the main board.

7. The hand-held binocular fisheye 3D VR camera according to claim 1, wherein the lens body is a binocular fisheye lens.

8. The hand-held binocular fisheye 3D VR camera according to claim 1, wherein one side surface of the housing is electrically connected with a USB interface through the main board.

* * * * *